United States Patent [19]

Friswell et al.

[11] Patent Number: 6,083,285
[45] Date of Patent: Jul. 4, 2000

[54] N,N-DIALKYLANILINE AZO DYE SOLUTIONS

[75] Inventors: Mike Friswell, Wayne, N.J.; Justin Frederico, Arlington, Va.; Haresh Doshi, Somerville, N.J.

[73] Assignee: Morton International, Inc., Chicago, Ill.

[21] Appl. No.: 09/160,430

[22] Filed: Sep. 24, 1998

[51] Int. Cl.⁷ ..................................................... D06P 1/04
[52] U.S. Cl. .......................... 8/521; 8/613; 8/617; 8/662; 585/5
[58] Field of Search ................ 8/521, 662, 613, 8/617; 534/576, 581, 528, 856, 859; 585/2, 3, 4, 5; 44/328

[56] References Cited

U.S. PATENT DOCUMENTS

| | | | |
|---|---|---|---|
| 3,049,533 | 8/1962 | Spitzer, Jr. et al. | 534/576 |
| 3,122,410 | 2/1964 | Mueller et al. | 8/524 |
| 3,476,500 | 11/1969 | Litke | 8/524 |
| 3,690,809 | 9/1972 | Orelup | 8/521 |
| 3,734,857 | 5/1973 | Moiso et al. | |
| 4,473,376 | 9/1984 | Hansen et al. | 8/521 |
| 4,904,765 | 2/1990 | Derber et al. | |
| 4,980,459 | 12/1990 | Rabassa et al. | 534/579 |
| 5,182,372 | 1/1993 | Derber et al. | |
| 5,266,277 | 11/1993 | Reichelt et al. | |
| 5,428,137 | 6/1995 | Otsuka et al. | 8/521 |
| 5,827,332 | 10/1998 | Zeidler et al. | 44/328 |

FOREIGN PATENT DOCUMENTS

| | | | |
|---|---|---|---|
| 0 256 460 A2 | 2/1988 | European Pat. Off. | C09B 67/22 |
| 0 419 976 A1 | 4/1991 | European Pat. Off. | C09B 19/085 |
| 0 499 845 A1 | 8/1992 | European Pat. Off. | C09B 29/085 |
| 0 553 858 A1 | 8/1993 | European Pat. Off. | C10L 1/00 |
| 803563 A1 | 10/1997 | European Pat. Off. | C10L 1/00 |
| 2122370 | 9/1971 | Germany | C09B 67/00 |
| 3700 329 A1 | 7/1988 | Germany | G01N 33/26 |

*Primary Examiner*—Caroline D. Liott
*Attorney, Agent, or Firm*—Wayne E. Nacker; Gerald K. White

[57] ABSTRACT

A stabilized, concentrated solution of a diazo dye is prepared by coupling diazotized aniline or substituted aniline with a dialkylaniline in the presence of an aromatic solvent. After removal of the aqueous phase, the solution is stabilized by the addition of a branched chain, primary or secondary, $C_3$–$C_6$ alkyl phenol.

11 Claims, No Drawings

N,N-DIALKYLANILINE AZO DYE SOLUTIONS

The present invention is directed to forming concentrated solutions of N,N-dialkylaniline azo dye solutions, which solutions are suitable for tagging petroleum fuels.

BACKGROUND OF THE INVENTION

N,N-dialkylaniline azo dyes, such as N,N-diethylaniline diazo aniline, may be used to tag petroleum fuels for purposes of taxi product identification, etc. Such dyes may be added to petroleum fuels, e.g., at between about 0.25 and about 100 parts per million by weight (ppm). Subsequently, the dyes may be identified by extraction with an acidic aqueous solution which produces a strong color.

To be useful as petroleum fuels markers, however, there are particular requirements for the form the dye should be in. Such dyes are solid and must be first of all be dissolved in a liquid, such as an aromatic solvent, which is compatible with the petroleum fuel.

Furthermore, extractable markers for tagging petroleum fuel are often packaged in conjunction with a non-extractable dye. Such dyes, include, for example, Automate Red B (Color Index: Solvent Red 164), Red NR (Color Index: Solvent Red 19), Red 1992, Blue 8 (Color Index: Solvent Blue 98), Blue 10, Orange 127, Blue-Black, etc.

Because regulatory agencies often have "intensity requirements" both for the extractable marker and for the non-extractable dye, it is desired to provide as concentrated solutions of such dyes as can be achieved. Also, when added to a non-extractable dyes, the solution of the extractable dye tends to increase the viscosity of the dye; thus, concentrated solutions are desired so that less solution need be added. Viscosity is particularly a problem in colder climates where the dye/marker solution may be stored in freezing conditions for extended periods of time.

The dyes used as markers in accordance with the invention are typically manufactured in a coupling reaction that produces a solid dye which is obtained as a filter cake, washed and dried. It has proven difficult to dissolve such dyes in fuel-compatible solvents and obtain highly concentrated solutions, 25 wt % dye solution being a typical upper limit. Furthermore, when dissolving such dyes, the solutions tend to have relatively high levels of insolubles, an undesirable characteristic of a fuel additive.

Accordingly, it is an object of the present invention to produce highly concentrated solutions of dialkylaniline dyes.

SUMMARY OF THE INVENTION

In accordance with the present invention an N,N-dialkylaniline is coupled to aniline or a substituted aniline in the presence of an aromatic hydrocarbon solvent such that the coupled dye migrates to the solvent-phase. The amount of aromatic solvent is used such that the dye concentrates in the solvent phase at between about 45 and about 70 wt %. After removal of the aqueous phase, the solvent phase is stabilized by the addition of a branched chain, primary or secondary, $C_3$–$C_6$ alkyl phenol. The alkyl phenol is added at a weight ratio relative to the organic solvent of between about 2:1 and about 1:2, preferably at about a 1:1 ratio. Stabilized dye concentrates containing 30 wt % or more, preferably 35 wt % or more, and more preferably 40 wt % or more are achieved. The dye concentrate, either alone or in admixture with a non-extractable, petroleum fuel miscible dye, may be added to petroleum fuel as a silent marker. Subsequently, the marker may be extracted from the tagged petroleum with an acidic aqueous solution, preferably containing between about 1 and about 25 wt % of a glycol, though the glycol is not absolutely necessary. The glycol allows the marker to be extracted with a lower concentration of acid than might otherwise be required. Upon extraction with acidic aqueous medium, the azo dye undergoes a chromophoric reaction, developing a strong, identifiable color.

DETAILED DESCRIPTION OF CERTAIN PREFERRED EMBODIMENTS

Herein, unless otherwise noted, all percentages are by weight.

The dyes used as petroleum fuel markers in accordance with the present invention have are formed by diazo coupling of an N,N-diethylaniline with aniline or substituted aniline having the general formula:

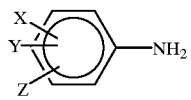

where X and Y are the same or different and are each selected from H, methyl, ethyl, isopropyl, butyl, methoxy, halogen and nitro and where Z is H or $NH_2$. Thus, the dyes used in the invention have the general formula:

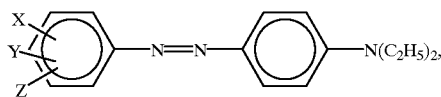

where X, Y and Z are as defined above.

In the first step, the aniline or substituted aniline is diazotized with sodium nitrite in acidic aqueous solution. In the second step, the diazotized aniline or substituted aniline is coupled with the N,N-dialkylaniline in a buffered solution in the presence of an aromatic hydrocarbon solvent. The aromatic solvent may be toluene, xylene, but is preferably an high-boiling aromatic solvent or solvent mixtures having a boiling point of at least about 375° F. (190° C.). Because the coupling is carried out in a buffered solution with the pH 3 or higher, the coupled dye migrates substantially entirely to the organic solvent phase. The amount of organic solvent used is such that the initial solution which is formed is between about 40 and about 60 wt % dye, preferably at least 40 wt %. This solution, however, does not have long-term stability, nor would it have long-term stability if merely diluted to end-use concentrations with additional aromatic solvent.

Accordingly, after the aqueous phase and extraneous water are removed, the dye solution is diluted to end-use concentration with the a branched chain, primary or secondary, $C_3$–$C_6$ alkyl phenol, e.g., o-isopropyl phenol, ortho-sec butyl phenol, and 2,6 di-sec butyl phenol. In the stabilized solution, the dye is preferably present at at least 30 wt %, more preferably at at least 35 wt %, and even more preferably at at least 40 wt % and even up to about 60 wt %. While it is desired that the solution be as concentrated as practical, it is generally difficult to obtain a concentrated solution of 60 wt % dye; thus the solutions according to the present invention generally contain at least about 40 wt % of the solvent system.

The concentrated solution may be directly used to introduce the marker dye into petroleum fuel as a taggant. Alternatively, the solution may be admixed with a fuel-miscible, non-extractable dye so as to provide a dye/marker package for coloring and tagging petroleum fuels. Such non-extractable dyes are described above.

The marker is typically used to tag petroleum fuel at between about 1 and about 25 parts per hundred by weight (ppm), preferably between about 5 and about 15 ppm.

The marker is extractable from petroleum fuel using an acidic aqueous solution, particularly a HCl solution. Preferably this solution contains between about 1 and about 25 wt % of a glycol, more preferably at least about 10 wt % of a glycol, such as ethylene glycol or propylene glycol. The glycol aids in the extraction and generally allows less acid to be used. As highly acidic solutions present health and safety concerns, this is considered to be desirable.

The invention will now be described in greater detail by way of specific examples.

EXAMPLE 1

Preparation of N,N-diethylaniline diazo aniline solution

To a 4-neck, three liter flask is charged:

| | |
|---|---|
| Ice | 400 gm |
| Aniline | 93 gm |
| HCl | 2.5 mole |
| Sodium Nitrate | 70 gm |

The sodium nitrite solution is added while maintaining the temperature at −2 to +2° C. Completion of diazotization is checked with starch iodide. The following coupler solution is added:

| | |
|---|---|
| N,N-diethylaniline | 165 gm |
| Aromatic 200 solvent | 100 gm |
| Sodium Formate | 140 gm |

The temperature is maintained below 10° C. with ice addition for six hours. Then the temperature is allowed to rise to 15–20° C. over the next six hours. The solution is heated to 80° C. The liquid phase is separated. Extraneous water is azeotroped at 125° C. Non-volatile weight yield is 235 grams. The solution is diluted to 40–42% active organic dye with ortho isopropyl phenol added to equal weight as the Aromatic 200.

EXAMPLE 2

An extractant solution is prepared from 25 wt % propylene glycol, 10 wt% HCl (27% of a 37% HCl solution), balance water.

What is claimed is:

1. A dye solution comprising at least about 30 wt % of N,N-diethylaniline diazo aniline, balance a solvent system comprising A) a hydrocarbon aromatic solvent and B) a cosolvent selected from the group consisting of o-isopropyl phenol, ortho-sec butyl phenol, and 2,6 di-sec butyl phenol, A) and B) being present at a weight ratio between about 2:1 and about 1:2.

2. The solution according to claim 1 comprising at least about 35 wt % of said N,N-diethylaniline diazo aniline.

3. The solution according to claim 1 comprising at least about 40 wt % of said N,N-diethylaniline diazo aniline.

4. A method of preparing a dye concentrate containing at least about 30 wt % of N,N-diethylaniline diazo aniline, the method comprising, in an acidic aqueous solution diazotizing aniline at a pH or about 3 or above, coupling said diazotized aniline to N,N-diethylaniline in the presence of an aromatic hydrocarbon solvent to form a coupled dyem wherein said aromatic hydrocarbon solvent is provided in an amount such that when said coupling is complete, said coupled dye is extracted in said aromatic solvent to at a concentration of at least 45 wt %, removing said aqueous phase, and stabilizing said solution at a concentration of at least about 30 wt % dye by the addition of a cosolvent selected from the group consisting of o-isopropyl phenol, ortho-sec butyl phenol, and 2,6 di-sec butyl phenol at a weight ratio relative to said aromatic hydrocarbon solvent between about 2:1 and about 1:2.

5. The solution according to claim 1 admixed with a fuel-miscible, non-extractable dye.

6. The solution according to claim 1 wherein said cosolvent is o-isopropyl phenol.

7. The solution according to claim 1 wherein said cosolvent is o-sec butyl phenol.

8. The solution according to claim 1 wherein said cosolvent is 2,6 di-sec butyl phenol.

9. The method according to claim 4 wherein said cosolvent is o-isopropyl phenol.

10. The method according to claim 4 wherein said cosolvent is o-sec butyl phenol.

11. The method according to claim 4 wherein said cosolvent is 2,6 di-sec butyl phenol.

* * * * *